(12) United States Patent
Cao et al.

(10) Patent No.: US 12,039,662 B2
(45) Date of Patent: Jul. 16, 2024

(54) METHOD AND APPARATUS FOR RECOGNIZING PIXEL POINT, ILLUMINATION RENDERING METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventors: Shun Cao, Shenzhen (CN); Huabing Xu, Shenzhen (CN); Nan Wei, Shenzhen (CN); Xiaochun Cui, Shenzhen (CN); Congbing Li, Shenzhen (CN); Rongxin Zhou, Shenzhen (CN); Wenyan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 199 days.

(21) Appl. No.: 17/699,791

(22) Filed: Mar. 21, 2022

(65) Prior Publication Data
US 2022/0207820 A1    Jun. 30, 2022

Related U.S. Application Data

(63) Continuation of application No. PCT/CN2020/123495, filed on Oct. 26, 2020.

(30) Foreign Application Priority Data

Jan. 22, 2020 (CN) .......................... 202010075307.3

(51) Int. Cl.
*G06T 15/50*    (2011.01)
*G06T 15/06*    (2011.01)
*G06T 15/80*    (2011.01)

(52) U.S. Cl.
CPC ............ *G06T 15/506* (2013.01); *G06T 15/06* (2013.01); *G06T 15/80* (2013.01)

(58) Field of Classification Search
CPC ........ G06T 15/06; G06T 15/50; G06T 15/506
See application file for complete search history.

(56) References Cited

U.S. PATENT DOCUMENTS

2019/0156551 A1    5/2019    Morgan et al.

FOREIGN PATENT DOCUMENTS

| CN | 104463853 A | 3/2015 |
|---|---|---|
| CN | 109993823 A | 7/2019 |

(Continued)

OTHER PUBLICATIONS

Luksch, Christian, et al. "Fast light-map computation with virtual polygon lights." Proceedings of the ACM SIGGRAPH symposium on interactive 3D graphics and games. 2013. (Year: 2013).*

(Continued)

*Primary Examiner* — Ryan McCulley
(74) *Attorney, Agent, or Firm* — Sughrue Mion, PLLC

(57) ABSTRACT

A method and apparatus for recognizing a pixel point, an illumination rendering method and apparatus, an electronic device, and a storage medium, which is used to effectively detect a pixel point located in a shadow region, to improve the quality of lightmap rendering. The method includes: obtaining a lightmap of a target object in a target scene; determining, according to a distance between each adjacent pixel point of a pixel point in the lightmap and the pixel point, a coverage radius corresponding to the pixel point; and determining, by using the pixel point as a starting point, that when a ray emitted along at least one tangential direction of the pixel point intersects an unlighted surface of an (Continued)

object in the target scene and a length of the ray is the same as the coverage radius, the pixel point is located in the shadow region.

17 Claims, 9 Drawing Sheets

(56) References Cited

FOREIGN PATENT DOCUMENTS

| CN | 111311723 A | 6/2020 |
|----|-------------|--------|
| JP | 2007-141082 A | 6/2007 |

OTHER PUBLICATIONS

International Search Report of PCT/CN2020/123495 dated Jan. 27, 2021 [PCT/ISA/210].
Written Opinion of PCT/CN2020/123495 dated Jan. 27, 2021 [PCT/ISA/237].
Office Action dated Mar. 29, 2023 from the Korean Patent Office in Application No. 10-2022-7006379.
Schaufler et al., "Ray Tracing Point Sampled Geometry", Rendering Techniques, Jun. 2000, (10 Total Pages).
Mr F, "Baking artifact-free lightmaps on the GPU" Aug. 29, 2018 (22 pages total) Accessed via the Internet: https://web.archive.org/web/20191127195346/https://ndotl.wordpress.com/2018/08/29/baking-artifact-free-lightmaps/.
Extended European Search Report dated May 9, 2023 in European Application No. 20916221.3.
English Translation of the Written Opinion issued Jan. 27, 2021 in International Application No. PCT/CN2020/123495.

\* cited by examiner

METHOD AND APPARATUS FOR RECOGNIZING PIXEL POINT, ILLUMINATION RENDERING METHOD AND APPARATUS, ELECTRONIC DEVICE, AND STORAGE MEDIUM

CROSS-REFERENCE TO RELATED APPLICATION(S)

This application is a continuation application of International Application No. PCT/CN2020/123495, filed on Oct. 26, 2020, which claims priority to Chinese Patent Application No. 202010075307.3, filed with the China National Intellectual Property Administration on Jan. 22, 2020, the disclosures of which are incorporated by reference in their entireties.

FIELD

The disclosure relates to the field of computer technologies, and in particular, to a method and apparatus for recognizing a pixel point, an illumination rendering method and apparatus, an electronic device, and a storage medium.

BACKGROUND

A lightmap is a picture in which lighting information is pre-generated for a static target object by using a global illumination algorithm. By using a light mapping technology, lighting information can be generated offline for a drawn object that is rendered in real time, improving the picture quality while ensuring performance.

In the related art, generally, geometry buffer (GBuffer) data of the lightmap is generated by using a general rasterization method. However, when a resolution of the lightmap is relatively low, a problem of shadow leakage is likely to occur. In this case, a pixel spans a plurality of regions, and the center of the pixel is located in the shadow region. At present, there is no method for detecting pixel points in a shadow region.

SUMMARY

According to embodiments of the disclosure, a pixel point recognition method and apparatus for a shadow region, an illumination rendering method and apparatus, an electronic device, and a storage medium are provided.

A method for recognizing a pixel point in a shadow region is provided, performed by an electronic device, the method including:
obtaining a lightmap of a target object in a target scene;
determining, according to a distance between each adjacent pixel point of a pixel point in the lightmap and the pixel point, a coverage radius corresponding to the pixel point; and
determining, by using the pixel point as a starting point, that when a ray emitted along at least one tangential direction of the pixel point intersects an unlighted surface of an object in the target scene and a length of the ray is the same as the coverage radius, the pixel point is located in a shadow region.

An illumination rendering method is provided, performed by an electronic device, the method including:
obtaining a lightmap of a target object in a target scene;
recognizing a pixel point in a shadow region from pixel points in the lightmap;
offsetting the pixel point in the shadow region in the pixel points, so that the offset pixel point is located outside the shadow region; and
performing illumination rendering on the target object according to the offset pixel point and the pixel point that is not offset.

An apparatus for recognizing a pixel point in a shadow region, including:
a first obtaining unit, configured to obtain a lightmap of a target object in a target scene;
a determining unit, configured to determine, according to a distance between each adjacent pixel point of a pixel point in the lightmap and the pixel point, a coverage radius corresponding to the pixel point; and
a first recognition unit, configured to determine, by using the pixel point as a starting point, that when a ray emitted along at least one tangential direction of the pixel point intersects an unlighted surface of an object in the target scene and a length of the ray is the same as the coverage radius, the pixel point is located in the shadow region.

In an example embodiment, the determining unit is further configured to:
determine an average distance between the pixel point and the adjacent pixel points, and set a product of the average distance and a preset ratio as the coverage radius; or
determine a maximum distance between the pixel point and the adjacent pixel points, and set a product of the maximum distance and a preset ratio as the coverage radius.

In an example embodiment, the apparatus further includes:
a first offset unit, configured to determine an offset corresponding to the pixel point according to an intersection between the ray and the unlighted surface, and offset the pixel point according to the offset, so that the offset pixel point is located outside the shadow region.

In an example embodiment, the first offset unit is further configured to:
set a distance between the starting point of the ray and the intersection between the ray and the unlighted surface as the offset, and move the pixel point along a direction of the ray by the offset.

In an example embodiment, the offset includes a first offset and the second offset; and
the apparatus further includes an offset unit.
The offset unit is further configured to set a distance between the starting point of the ray and the intersection between the ray and the unlighted surface as the first offset, and set a preset distance as the second offset; and
move the pixel point along a direction of the ray by the first offset, and move, by the second offset, the pixel point along a normal direction of an object intersecting the ray.

In an example embodiment, in a case that at least two rays intersect an unlighted surface of an object in the target scene, the ray is a ray that is of the at least two rays and that is with the shortest distance from a starting point of the ray to an intersection between the ray and the unlighted surface.

An illumination rendering apparatus, including:
a second obtaining unit, configured to obtain a lightmap of a target object in a target scene;
a second recognition unit, configured to recognize a pixel point in a shadow region from pixel points in the lightmap;
a second offset unit, configured to offset the pixel point in the shadow region in the pixel points, so that the offset pixel point is located outside the shadow region; and
a rendering unit, configured to perform illumination rendering on the target object according to the offset pixel point and the pixel point that is not offset.

In an example embodiment, the second recognition unit is further configured to:
determine, for any pixel point in the lightmap, a coverage radius corresponding to the pixel point according to a distance between each adjacent pixel point of the pixel point and the pixel point, the distance between the each adjacent pixel point of the pixel point and the pixel point being determined according to world coordinates of the pixel point and world coordinates of the each adjacent pixel point; and determine, by using the pixel point as a starting point, that when a ray emitted along at least one tangential direction of the pixel point intersects an unlighted surface of an object in the target scene and a length of the ray is the same as the coverage radius, the pixel point is located in the shadow region.

In an example embodiment, the second recognition unit is further configured to:
determine an average distance between the pixel point and the adjacent pixel points, and set a product of the average distance and a preset ratio as the coverage radius; or
determine a maximum distance between the pixel point and the adjacent pixel points, and set a product of the maximum distance and a preset ratio as the coverage radius.

In an example embodiment, the second offset unit is further configured to:
determine, for any pixel point in the lightmap, an offset corresponding to the pixel point according to an intersection between the ray and the unlighted surface, and offset the pixel point according to the offset.

In an example embodiment, the second offset unit is further configured to:
set a distance between the starting point of the ray and the intersection between the ray and the unlighted surface as the offset, and move the pixel point along a direction of the ray by the offset.

In an example embodiment, the offset includes a first offset and the second offset; and the second offset unit is further configured to:
set a distance between the starting point of the ray and the intersection between the ray and the unlighted surface as the first offset, and set a preset distance as the second offset; and move the pixel point along a direction of the ray by the first offset, and move, by the second offset, the pixel point along a normal direction of an object intersecting the ray.

In an example embodiment, in a case that at least two rays intersect an unlighted surface of an object in the target scene, the ray is a ray that is of the at least two rays and that is with the shortest distance from a starting point of the ray to an intersection between the ray and the unlighted surface.

An electronic device is provided, including a processor and a memory, the memory storing program code, the program code, when executed by the processor, causing the processor to perform operations of any one of the method for recognizing a pixel point in a shadow region or the illumination rendering method.

A computer-readable storage medium, including program code, the program code, when run on an electronic device, causing the electronic device to perform operations of any one of the method for recognizing a pixel point in a shadow region or the illumination rendering method.

A computer program product is provided, including program code, the program code is stored in a computer-readable storage medium. When a processor of an electronic device reads and executes the program code from the computer-readable storage medium, the electronic device is caused to perform operations of any one of the method for recognizing a pixel point in a shadow region or the illumination rendering method.

Details of one or more embodiments of the disclosure are provided in the subsequent accompanying drawings and descriptions. Other features and advantages of the disclosure become obvious with reference to the specification, the accompanying drawings, and the claims.

BRIEF DESCRIPTION OF THE DRAWINGS

To describe the technical solutions of example embodiments of this disclosure more clearly, the following briefly introduces the accompanying drawings for describing the example embodiments. The accompanying drawings herein are incorporated into the specification and constitute a part of this specification, show embodiments that conform to the disclosure, and are used for describing a principle of the disclosure together with this specification. The accompanying drawings described below are merely some embodiments of the disclosure, and a person of ordinary skill in the art may further obtain other accompanying drawings according to the accompanying drawings without creative efforts. In addition, one of ordinary skill would understand that aspects of example embodiments may be combined together or implemented alone. In the accompanying drawings.

DESCRIPTION OF EMBODIMENTS

Figure 1:
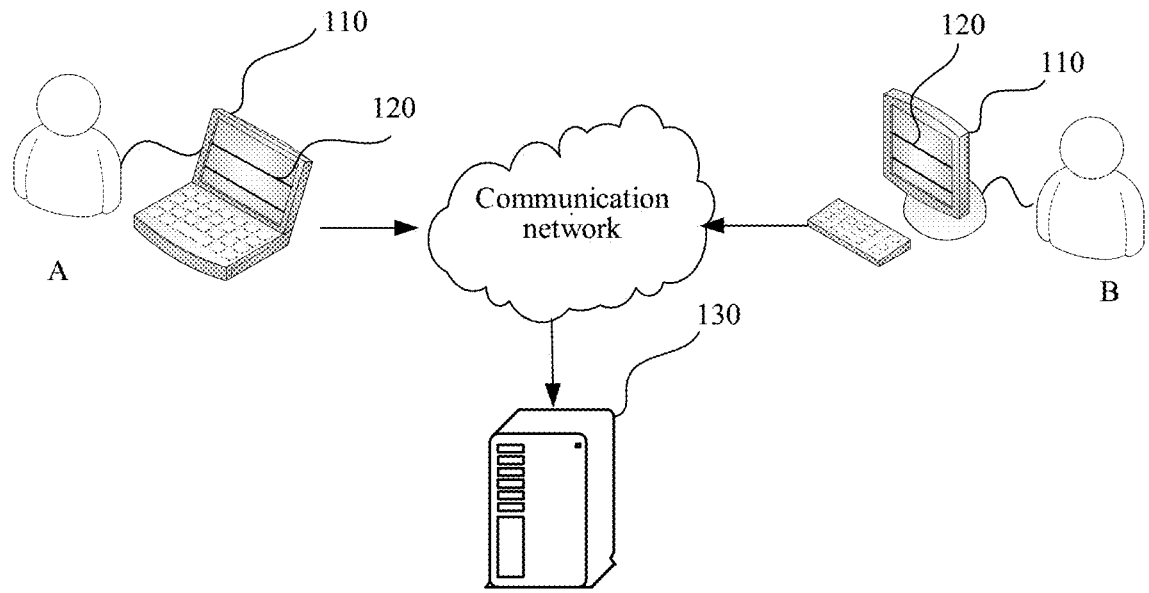
FIG. 1 is a schematic diagram of an application scenario according to an embodiment of the disclosure.

To make the objectives, technical solutions, and advantages of the embodiments of the disclosure clearer, the technical solutions in the disclosure will be clearly and completely described in the following with reference to the accompanying drawings in the embodiments of the disclosure. The described embodiments are merely a part rather than all of the embodiments of the technical solutions of the disclosure. All other embodiments obtained by a person of ordinary skill in the art based on the embodiments recorded in the document of the disclosure without creative efforts shall fall within the protection scope of the technical solutions of the disclosure.

The following describes some concepts involved in the embodiments of the disclosure.

1. Lightmap is a picture in which lighting information is pre-generated for a static target object by using a global illumination algorithm. Global illumination is a unique term in three-dimensional software, and light has the properties of reflection and refraction. In real nature, the light from the sun to the ground is reflected and refracted countless times, so we can clearly see any place on the ground (during daytime). Although light in the three-dimensional software has all the properties of the light in reality, the transmission of radiant energy of the light is not obvious. Before global illumination is enabled, the three-dimensional software performs calculation only on a dark surface and a bright surface, and after the global illumination is enabled, the three-dimensional software performs calculation on various light effects such as light reflection and refraction.

In the embodiments of the disclosure, a lightmap corresponding to an object is used for performing illumination rendering on the object. Similar to color rendering, illumination rendering is used for rendering illumination effects for the object to simulate an effect of lighting on the object in a real scene. Each pixel point in the lightmap has corresponding lighting information, that is, a pixel value or color value, and the object can be illuminated and rendered according to the lighting information of the pixel point.

2. Rasterization is a process of converting vertex data into fragments, which has the function of transforming an image into an image formed by rasters, and the characteristic is that each element corresponds to a pixel in a frame buffer. Rasterization is the process of converting the vertex data into the fragments. Each element in the fragment corresponds to a pixel in the frame buffer. Rasterization is actually a process of converting a geometric primitive into a two-dimensional image. In the embodiments of the disclosure, rasterization is a process of converting an object formed by triangle facets into triangles, and information such as UV coordinates of each vertex of the triangle can be obtained. In addition, by performing rasterized interpolation according to a vertex position of the triangle, how many pixel points are needed to form the triangle and what information each pixel point needs to obtain may be determined, for example, UV coordinates, a tangent, a normal, and other information.

The UV coordinates refer to texture coordinates, which are coordinates in a two-dimensional space. U represents a horizontal direction, V represents a vertical direction, and value ranges of coordinates of U and V are both 0 to 1.

3. GBuffer data of a lightmap is buffer information by using a size of the lightmap as a resolution, including various pieces of data such as a position, a tangent, a normal, and a texture obtained after rasterized interpolation is performed. Different from only rendering a color into a texture, GBuffer is a buffer including position information, normal information, tangent information, texture information, and the like.

4. Coordinates of a center of gravity: In a triangle, the coordinates of a center of gravity are also referred to as area coordinates, because coordinates of a point s (a center of gravity) relative to the center of gravity of a triangle abc are proportional to (directed) areas of triangles sbc, sca, and sab. In the embodiments of the disclosure, the data obtained after rasterized interpolation may be calculated by using the method of calculating the coordinates of the center of gravity of the triangle.

5. Path tracing is a first unbiased rendering method. According to a basic idea of the path tracing method, a light is emitted from a viewpoint, when the light intersects a surface of a target object, sampling is continued in one direction according to material properties of the surface and another ray is emitted. Such iteration is performed until the light hits a light source (or escapes a scene), and a Monte Carlo method is used to calculate contribution of the light as a color value of a pixel. The Monte Carlo method is unbiased to solve an integral, as long as the time is long enough, an image can finally converge to a correct result. In the embodiments of the disclosure, lighting information corresponding to a pixel point can be rendered mainly using the path tracing method, and illumination rendering can be performed on the object according to the lighting information of the pixel point.

6. Texel (a portmanteau of texture element or texture pixel) is an abbreviation of texture element, which is a basic unit in a texture space of computer graphics. As an image is made up of pixels, the texture is represented by the arrangement of texels. When a texture is laid on a three-dimensional surface, the texel is mapped to an appropriate pixel of an output image by using the texture mapping technology. The texel corresponds to the pixel in the embodiments of the disclosure.

7. World coordinate system is an absolute coordinate system of a system. Before a user coordinate system is established, coordinates of all points on a picture are respectively determined by using an origin of the world coordinate system. In the embodiments of the disclosure, the world coordinate system is a three-dimensional coordinate system, and coordinates of a point in the world coordinate system, that is, a point on a surface of an object, are referred to as world coordinates.

8. Unlighted surface is a surface of a region where an object cannot receive light. In the embodiments of the disclosure, a surface of the object that cannot receive light is a backface of the object, and the light in this part of the region is blocked. The front face or backface of the object is distinguished according to a normal of the object in the world coordinate system.

9. Monte Carlo method, also referred to as a statistical simulation method, is a very important type of numerical calculation method guided by probability and statistics theory that was proposed in the mid-1940s due to the development of science and technology and the invention of electronic computers, which is a method for resolving many computing problems by using random numbers (or more commonly pseudo-random numbers).

10. Target scene is a scene including a three-dimensional model. In the embodiments of the disclosure, the target scene is a game scene, an animation scene, or the like. The three-dimensional model in the target scene is the object in the embodiments of the disclosure. An example in which the target scene is a game scene is used, and objects in the game scene include a house, a tree, a vehicle, and the like.

11. Pixel point is a center position of a pixel. The pixel in the embodiments of the disclosure is not a point, but is in a form of a small square. For example, in a lightmap formed by many pixels shown in FIG. 4, one of the small squares represents a pixel, and a center of the pixel is a pixel point.

A design idea of the embodiments of the disclosure is briefly introduced below.

With the development of computer technologies, the production of art scene is widely applied. For example, in the fields of game development, animation production, and video processing, the presentation of various art scenes becomes increasingly elaborate and beautiful. To further optimize the production effect of the art scene and meet the requirements of the user for a picture, an illumination effect of the art scene needs to be processed.

A common processing manner is to add a lightmap, and lighting information is pre-generated for a static target object by using a global illumination algorithm. In the related art, GBuffer data of the lightmap is usually generated by using a general rasterization method, and illumination rendering is then performed according to the GBuffer data through path tracing, which may specifically include the following two steps:

First, the GBuffer data of the lightmap is generated through simple rasterization or general rasterization. Each pixel point in a GBuffer includes position information, normal information, tangent information, texture information of the pixel point obtained after rasterization and interpolation.

Subsequently, for the pixel point of the GBuffer in each lightmap, rendering information is generated by using a path tracing method. A starting position of path tracing is position information buffered in the GBuffer, and a starting direction is a direction from a starting point to a random position on a hemispherical surface that uses a normal as a center.

However, the GBuffer data of the lightmap generated through general rasterization causes a problem of shadow leakage. When a resolution of the lightmap is relatively low, texel coordinates of a single lightmap may span a plurality of regions. If part of the region happens to be inside a shadow and part outside the shadow, and a sampling point happens to be in a shadow region, the problem of shadow leakage occurs. For example, when the plurality of regions include a region blocked by a wall and a region not blocked by a wall, the problem of shadow leakage is likely to occur at a junction between the walls.

A common method for resolving the problem of shadow leakage is to increase the resolution of the lightmap. However, increasing the resolution not only increases a storage space of the lightmap, but also brings about a problem of rendering efficiency.

In view of this, the embodiments of the disclosure provide a pixel point recognition method and apparatus for a shadow region, an illumination rendering method and apparatus, an electronic device, and a storage medium. First, the embodiments of the disclosure provide a method for recognizing a pixel point in a shadow region, which can effectively detect the pixel point located in the shadow region. Further, on this basis, after the pixel point located in the shadow region is recognized, the pixel point located in the shadow region may be offset, so that the pixel point is offset from a blocked position to an unblocked position, the offset pixel point is no longer located in the shadow region, and there is no need to increase the resolution of the lightmap. When illumination rendering is performed based on the offset pixel point and the pixel point that is not offset, shadow leakage can be effectively reduced.

The following describes the preferred embodiments of the disclosure with reference to the accompanying drawings of the specification. It is to be understood that the preferred embodiments described herein are merely used for illustrating and explaining the disclosure, but are not intended to limit the disclosure. In addition, the embodiments of the disclosure and features in the embodiments may be mutually combined in a case of no conflict.

FIG. 1 is a schematic diagram of an application scenario according to an embodiment of the disclosure. The application scenario includes two terminal devices 110 and a server 130, and an operation interface 120 of an illumination rendering tool may be logged in by using the terminal device 110. The terminal device 110 may communicate with the server 130 by using a communication network.

In an example embodiment, the communication network is a wired network or a wireless network.

In this embodiment of the disclosure, the terminal device 110 is an electronic device used by a user. The electronic device may be a computer device such as a personal computer, a mobile phone, a tablet computer, a notebook computer, or an ebook reader that has a specific computing capability and runs instant messaging software and websites or social software and websites. The terminal devices 110 are connected to the server 130 through a wireless network. The server 130 may be one server, a server cluster including several servers, or a cloud computing center, or a virtualization platform.

In this embodiment of the disclosure, the terminal device 110 is configured to receive an illumination rendering task triggered by the user through the operation interface 120 of the illumination rendering tool, to recognize a pixel point in a shadow region and perform illumination rendering by communicating with the server 130.

Figure 2:
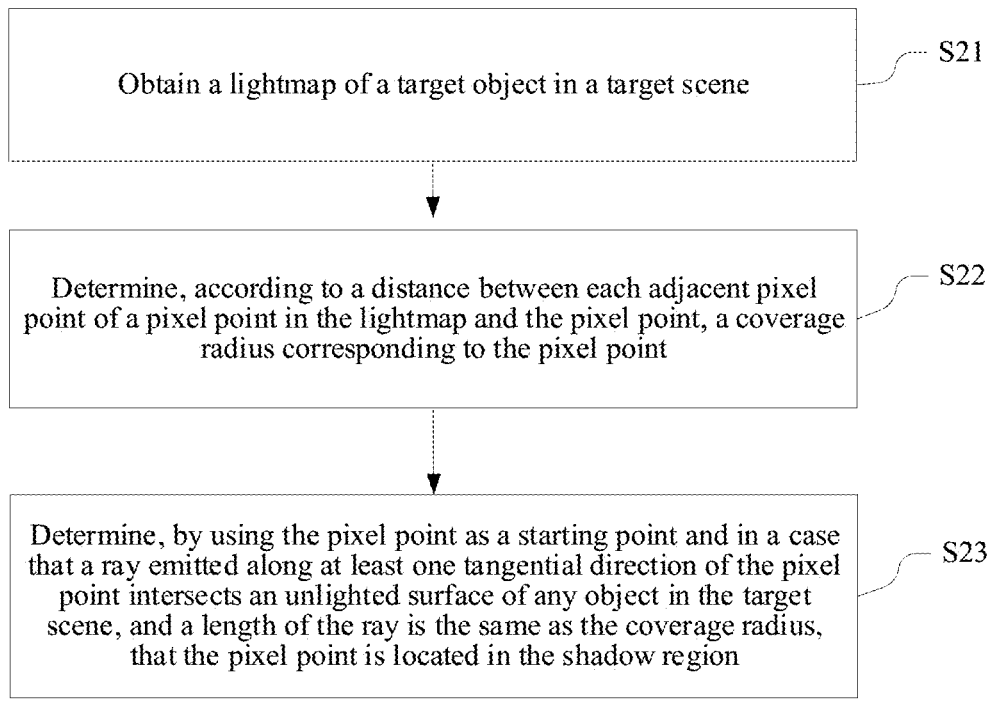
FIG. 2 is a flowchart of a method for recognizing a pixel point in a shadow region according to an embodiment of the disclosure.

FIG. 2 is an implementation flowchart of a method for recognizing a pixel point in a shadow region according to an embodiment of the disclosure. The method is applied to the terminal device 110 or the server 130 shown in FIG. 1, and a specific implementing process of the method is as follows:

S21: Obtain a lightmap of a target object in a target scene.

In this embodiment of the disclosure, the target scene is a game scene, an animation scene, or the like. A three-dimensional model in the target scene is an object. An example in which the target scene is a game scene is used, and an object in the game scene may be a house, a tree, a vehicle, or the like. The object in the game scene generally has a corresponding lightmap, so that actual light changes can be simulated on the object in the game scene, to produce a light and shadow effect.

S22: Determine, according to a distance between each adjacent pixel point of a pixel point in the lightmap and the pixel point, a coverage radius corresponding to the pixel point.

In this embodiment of the disclosure, a surface of an object is spliced by several triangle facets. After the target object is processed through general rasterization, several triangles can be obtained in the lightmap, and GBuffer data including position information, normal information, tangent information, texture information, and the like of vertices of the triangles can be obtained.

In addition, interpolation information in a GBuffer may be calculated by using a general rasterization algorithm, that is, interpolation information of pixel points inside the triangle can be calculated.

The interpolation information includes the position information, the normal information, the tangent information, the texture information, and the like.

The position information in this embodiment of the disclosure is three-dimensional coordinate information in a world coordinate system, which may be represented by (x, y, z), where x represents a horizontal direction, y represents a vertical direction, and z represents a depth direction. The texture information is two-dimensional coordinate information in a two-dimensional space, which may be represented by (U, V), where U represents a horizontal direction, and V represents a vertical direction.

The tangent information is information of a tangent plane, a tangent vector or a tangential direction. The normal information is information of a normal plane, a normal vector or a normal direction.

In this embodiment of the disclosure, a change of U and V has a linear effect on x, and an effect on y and z is also linear. Assuming that position coordinates of a vertex in a triangle are (x, y, z), and texture coordinates are (U, V), then d(x, y, z)/dU can be used to represent a tangent T corresponding to the vertex, d(x, y, z)/dV is a secondary normal Q, then a normal corresponding to the vertex is: N=T×Q.

The foregoing is only a representation form of the tangent information and the normal information listed in this embodiment of the disclosure, and other representation forms are also applicable to this embodiment of the disclosure. This is not specifically limited herein.

Figure 3:
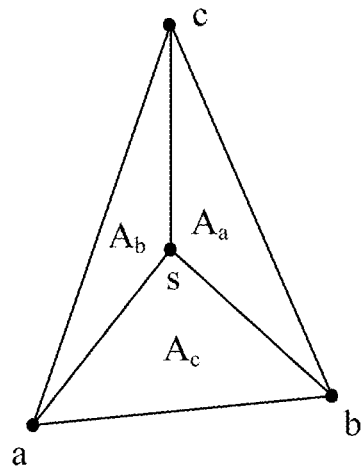
FIG. 3 is a schematic diagram of a center of gravity of a triangle according to an embodiment of the disclosure.

In an example embodiment, the interpolation information of the pixel point is calculated by calculating coordinates of a center of gravity of the triangle. A detailed process is as follows:

A pixel point s shown in FIG. 3 is used as an example, and a triangle in which the pixel point s is located is a triangle abc. The pixel point s is used as a center of gravity of the triangle abc, and the triangle is divided into three parts sbc, sac, and sab by connecting the center of gravity s of the triangle to vertexes a, b, and c. Assuming that coordinates of the center of gravity s are ($\alpha$, $\beta$, $\gamma$), a calculation formula of the coordinates of the center of gravity is:

$$\alpha = Aa/A,\ \beta = Ab/A,\ \gamma = Ac/A.$$

where A=Aa+Ab+Ac, Aa represents an area of the triangle sbc, Ab represents an area of the triangle sac, and AC represents an area of the triangle sab.

When the interpolation information is calculated according to the coordinates of the center of gravity, a calculation formula is as follows:

$$\text{Value} = \alpha*\text{Value}A + \beta*\text{Value}B + \gamma*\text{Value}C.$$

where Value may represent any one of the position information, the normal information, the tangent information, the texture information, or the like.

An example in which Value represents the position information is used. When position information of the pixel point s is calculated, ValueA in the formula is substituted for position information of the vertex a, ValueB is substituted for position information of the vertex b, and ValueC is substituted for position information of the vertex c. In this case, Value calculated by the above calculation formula represents the position information of the pixel point s.

For example, the position information of the vertex a is represented as (x1, y1, z1); the position information of the vertex b is represented as (x2, y2, z2); and the position information of the vertex c is represented as (x3, y3, z3). Assuming that the position information of the pixel point s is represented as (x0, y0, z0), $$x0 = \alpha*x1 + \beta*x2 + \gamma*x3;$$

$$y0 = \alpha*y1 + \beta*y2 + \gamma*y3;$$

$$z0 = \alpha*z1 + \beta*z2 + \gamma*z3.$$

In addition, it is similar when Value represents interpolation information such as the tangent information, the normal information, or the texture information.

In this embodiment of the disclosure, the distance between each adjacent pixel point and the pixel point is determined according to world coordinates of the pixel point and world coordinates of the each adjacent pixel point.

Figure 4:
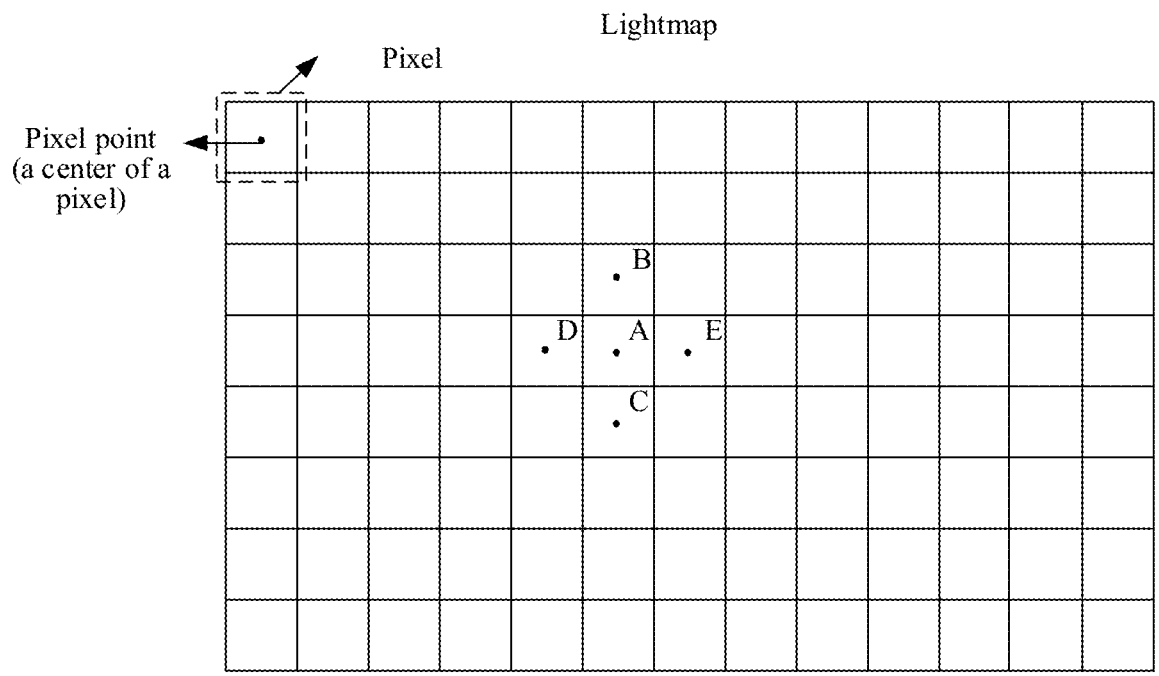
FIG. 4 is a schematic diagram of a lightmap according to an embodiment of the disclosure.

Adjacent pixel points corresponding to a pixel point are included in the lightmap. The pixel points adjacent to the top, bottom, left, and right of the pixel point are shown in FIG. 4. For a pixel point A, adjacent pixel points corresponding to this pixel point are four pixel points B, C, D, and E at the top, bottom, left, and right of this pixel point.

World coordinates of the pixel point are three-dimensional coordinates in a world coordinate system, which is represented by (x, y, z).

In an example embodiment, in a case of determining, according to a distance between each adjacent pixel point of a pixel point in the lightmap of the target object at which the pixel point is located and the pixel point, a coverage radius corresponding to the pixel point, the following manners are specifically included:

Determining manner I: Determine an average distance between the pixel point and the adjacent pixel points, and set a product of the determined average distance and a preset ratio as the coverage radius.

In this embodiment of the disclosure, adjacent pixel points of any pixel point can be determined according to a lightmap in which a three-dimensional object is mapped. When the distance between the pixel point and each adjacent pixel point is calculated, the distance is determined according to three-dimensional coordinates, that is, the world coordinates of the pixel point in the world coordinate system.

Using the pixel point A as an example, referring to FIG. 4, adjacent pixel points of the pixel point A are a pixel point B, a pixel point C, a pixel point D, and a pixel point E.

Assuming that world coordinates corresponding to the pixel point A are (xa, ya, za), world coordinates corresponding to the adjacent pixel points B, C, D, and E of the pixel point A are respectively (xb, yb, zb), (xc, yc, zc), (xd, yd, zd), and (xe, ye, ze).

A distance $d_{ab}$ between the pixel point A and the pixel point B is:

$$d_{ab} = \sqrt{(xa-xb)^2 + (ya-yb)^2 + (za-zb)^2};$$

Similarly, a distance between the pixel point A and the pixel point C is $d_{ac}$, a distance between the pixel point A and the pixel point D is $d_{ad}$, and a distance between the pixel point A and the pixel point E is $d_{ae}$.

Therefore, an average distance between the pixel point A and the adjacent pixel points is d=(dab+dac+dad+dae)/4. Assuming that the preset ratio is a, a coverage radius corresponding to the pixel point A is d*r.

Determining manner II: Determine a maximum distance between the pixel point and the adjacent pixel points, and set a product of the maximum distance and a preset ratio as the coverage radius.

Still using the pixel point A as an example, assuming that a maximum distance among $d_{ab}$, $d_{ac}$, $d_{ad}$, and $d_{ae}$ is $d_{ac}$, the coverage radius corresponding to the pixel point A is $d_{ac}*r$.

In an example embodiment, the maximum distance between the pixel point and the adjacent pixel points may alternatively be a maximum distance in all directions, that is, a maximum distance in the three directions of x, y, and z.

Assuming that a horizontal proximity maximum value is ddx, a vertical proximity maximum value is ddy, and a depth proximity maximum value is ddz, the maximum distance is the maximum value in all directions: max(ddx, max(ddy, ddz)).

Therefore, the coverage radius corresponding to the pixel point A is max(ddx, max(ddy, ddz))*r.

In this embodiment of the disclosure, the preset ratio may be set in a plurality of manners, for example, a preset ratio r is generally ½. If a diagonal distance is considered, the preset ratio r is $\sqrt{2}/2$.

Assuming that dd=max(ddx, max(ddy, ddz)), in a case of considering the diagonal distance, the coverage radius corresponding to the pixel point A is $dd*2/2=\sqrt{dd^2+dd^2}$.

The manners that are of determining the coverage radius and that are listed in the embodiments of the disclosure are merely examples, and any manner of determining the coverage radius is applicable to the embodiments of the disclosure.

S23: Determine, by using the pixel point as a starting point, that when a ray emitted along at least one tangential direction of the pixel point intersects an unlighted surface of an object in the target scene and a length of the ray is the same as the coverage radius, the pixel point is located in the shadow region.

Setting the pixel point as the starting point refers to setting a world coordinate position of the pixel point in the world coordinate system as the starting point, and the tangential direction of the pixel point is determined according to the tangent information in the interpolation information of the pixel point listed in the foregoing embodiment.

The pixel point A in FIG. 4 is used as an example. Tangent information of the pixel point A may be calculated according to tangent information of the vertexes in the triangle in which the pixel point A is located. Assuming that the tangent information of the pixel point A is represented as a tangent $T_A$, and similarly, assuming that normal information of the pixel point A is represented as a normal $N_A$, the tangent $T_A$ rotates at different angles along the normal $N_A$ to generate a plurality of tangents, corresponding to a plurality of tangential directions.

When rays are emitted, an optional implementation is to randomly select a tangential direction to emit several rays, these rays are a plurality of rays emitted in the same tangential direction.

Another example embodiment is to randomly select several different tangential directions, and emit one ray along each tangential direction. In this case, a plurality of rays are emitted along different tangential directions.

In addition, when the rays are emitted, a plurality of rays may be simultaneously emitted, or only one ray may be emitted at a time, and the emitting is stopped until a ray intersects an unlighted surface of an object in the target scene, or the emitting is stopped when the quantity of times of emitting reaches an upper limit.

A game scene is used as an example. Assuming that the target scene includes a house, a tree, and a car, where the target object is the house, an object in the target scene refers to any one of the house, the tree or the car, so that the object may be the house, the tree or the car. The unlighted surface of an object in the target scene may be a backface (a surface facing away from light) of the target object, or may be a backface of another object in the target scene except the target object. If at least one ray hits a backface of an object, interpolation information of a pixel point in a GBuffer may be recalculated, and the interpolation information of the pixel point is updated to the GBuffer.

In the foregoing example embodiment, the coverage radius corresponding to the pixel point can be determined based on the distance between the pixel point and the adjacent pixel point of the pixel point in the world coordinate system, and the ray is emitted according to the coverage radius of the pixel point. Whether the pixel point is blocked may be determined according to whether the ray intersects the unlighted surface of the object in the target scene, and therefore, the pixel point located in the shadow region may be effectively detected. The unlighted surface is a surface of the object being blocked. On this basis, after the pixel point of the lightmap in the shadow region is detected, the pixel point may be offset, so as to improve quality of lightmap rendering and reduce leakage of the shadow region during illumination rendering.

In this embodiment of the disclosure, if it is determined that the pixel point is located in the shadow region, an offset corresponding to the pixel point may be determined according to the intersection between the ray and the unlighted surface, and the pixel point is offset according to the offset, so that the offset pixel point is located outside the shadow region.

If there are at least two rays intersect an unlighted surface of an object in the target scene, a ray needs to be selected from the at least two rays, to determine the offset according to an intersection between the selected ray and the unlighted surface.

In an example embodiment, the selected ray is a ray that is of the at least two rays and that is with the shortest distance from a starting point of the ray to an intersection between the ray and the unlighted surface.

Figure 5A:
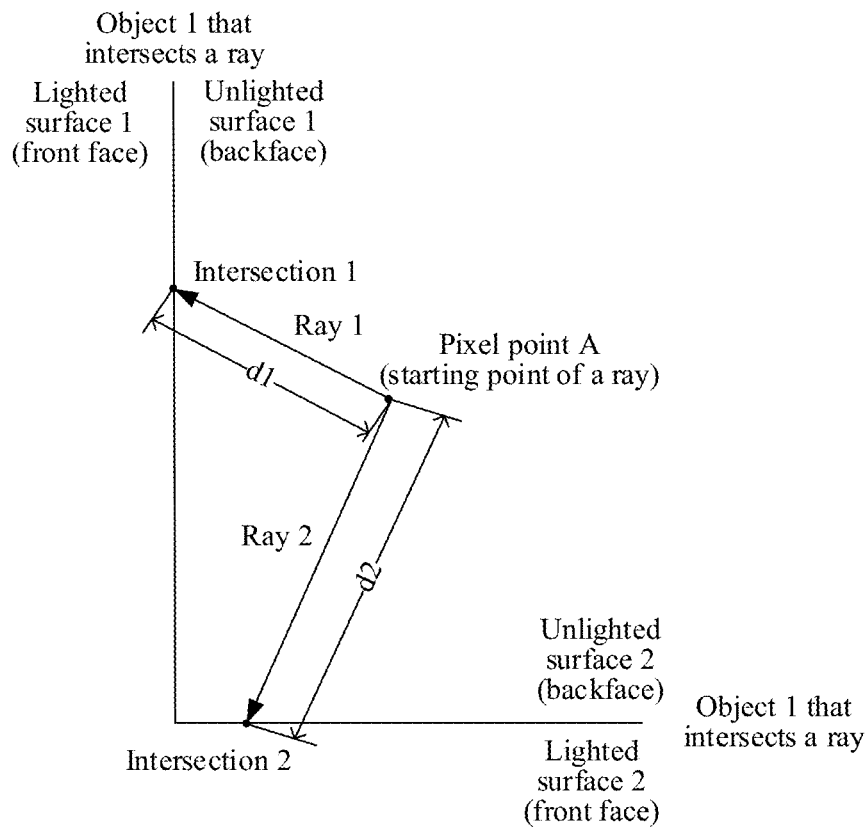
FIG. 5A is a schematic diagram of a ray emitted according to an embodiment of the disclosure.

For example, as shown in FIG. 5A, a center position of a pixel point A is used as a starting point of a ray, and a length of the ray is TexelRadius/2. Assuming that there are two rays intersect two unlighted surfaces of an object 1 in a target scene, where a distance between a starting point of the ray and an intersection between the ray and the unlighted surface 1 is a distance between the pixel point A and an intersection 1, which is assumed to be d1; and a distance between the starting point of the ray and an intersection between the ray and the unlighted surface 2 is a distance between the pixel point A and an intersection 2, which is assumed to be d2. Obviously, d1<d2. In this case, the ray selected from the two rays is a ray 1, and an offset corresponding to the pixel point A is determined according to the intersection 1.

In this embodiment of the disclosure, if there is only one ray intersects the unlighted surface of an object in the target scene, the offset corresponding to the pixel point can be directly determined according to the intersection between the ray and the unlighted surface.

When the offset corresponding to the pixel point is determined according to the intersection between the ray and the unlighted surface, there are the following two implementations:

An example embodiment is to set a distance between the starting point of the ray and the intersection between the ray and the unlighted surface as the offset, and move the pixel point along a direction of the ray by the offset.

Figure 5B:
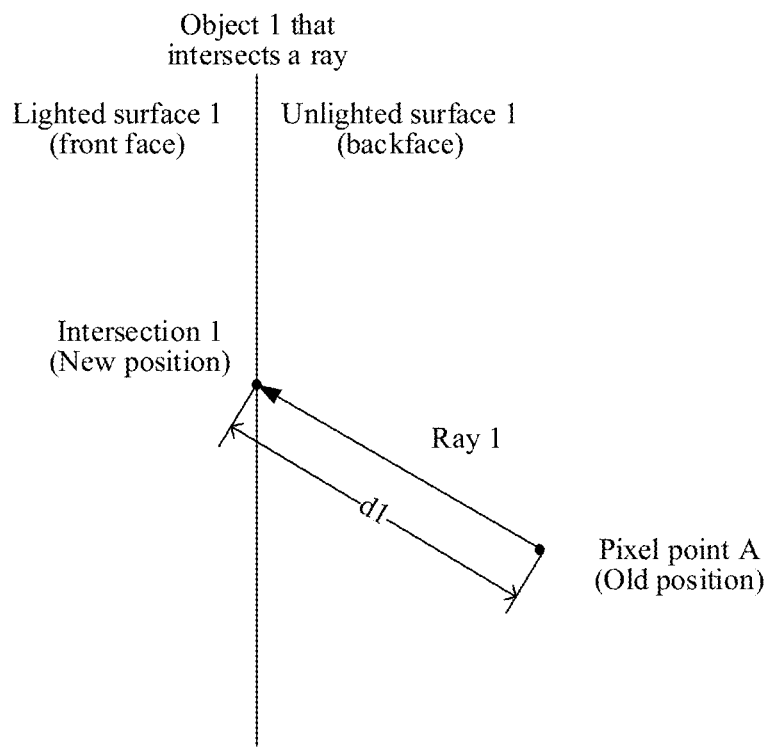
FIG. 5B is a schematic diagram of a pixel point offset according to an embodiment of the disclosure.

The pixel point A shown in FIG. 5A is used as an example, the offset is a distance between a starting point of the ray 1 and the intersection 1, that is d1. Therefore, after the pixel point is moved along a direction of the ray 1 by d1, a new position, that is, the intersection 1 is shown in FIG. 5B.

If expressed by a formula, the new position may be determined by using the following calculation formula:

new_pos=old_pos+ray.dir*hit.distance;

where new_pos represents a new position of a pixel point after being offset, old_pos represents an old position of the pixel point before being offset, that is, a position generated by using a general rasterization algorithm, ray.dir represents a direction vector of a ray, and hit.distance represents a distance between a starting point of the ray and an intersection between the ray and an unlighted surface.

Another example embodiment is that the offset includes a first offset and a second offset.

A specific offset process is as follows: set a distance between the starting point of the ray and the intersection between the ray and the unlighted surface as the first offset, and set a preset distance as the second offset; and move the pixel point along a direction of the ray by the first offset, and move, by the second offset, the pixel point along a normal direction of an object intersecting the ray.

Figure 5C:
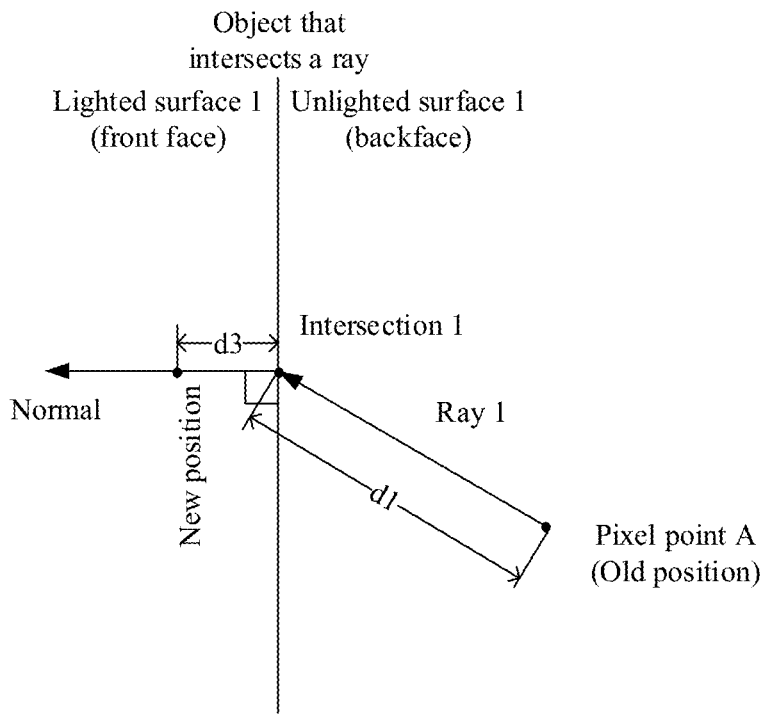
FIG. 5C is a schematic diagram of another pixel point offset according to an embodiment of the disclosure.

The normal direction of the object intersecting the ray is a normal direction of a front face of the object, that is, a normal direction of a lighted surface 1. As shown in FIG. 5C, the first offset is a distance between the pixel point A and the intersection 1, that is, d1, and the second offset is d3. Therefore, after being moved to the intersection 1, the center position of the pixel point A is then moved along a normal direction shown in FIG. 5C by d3, and finally, a new center position of the pixel point A is a new position shown in FIG. 5C.

If expressed by a formula, the new position may be determined by using the following calculation formula:

new_pos=old_pos+ray.dir*hit.distance+
hit.face_normal*bias.

where new_pos represents a new position of a pixel point after being offset, old_pos represents an old position of the pixel point before being offset, that is, a position generated by using a general rasterization algorithm, ray.dir represents a direction vector of a ray, hit.distance represents a distance between a starting point of the ray and an intersection between the ray and an unlighted surface, hit.face_normal represents a normal vector of a front face of an object hit by the ray, and bias represents a distance offset along a normal direction of the front face of the hit object, which may be set by an external parameter, that is, the second offset in the foregoing embodiment.

The center position of the pixel point A may alternatively be moved, by the second offset, along the normal direction of the object intersecting the ray, and then be moved along a direction of the ray by the first offset. The sequence of the two movements is not specifically limited in this embodiment of the disclosure.

In the foregoing example embodiments, the offset pixel point may be in a light-reachable region as much as possible by using the offset method, so as not to be blocked. The second offset is used to eliminate errors caused by floating-point numbers. After offsetting is performed in this manner, the new position obtained is more accurate and reliable.

Figure 6:
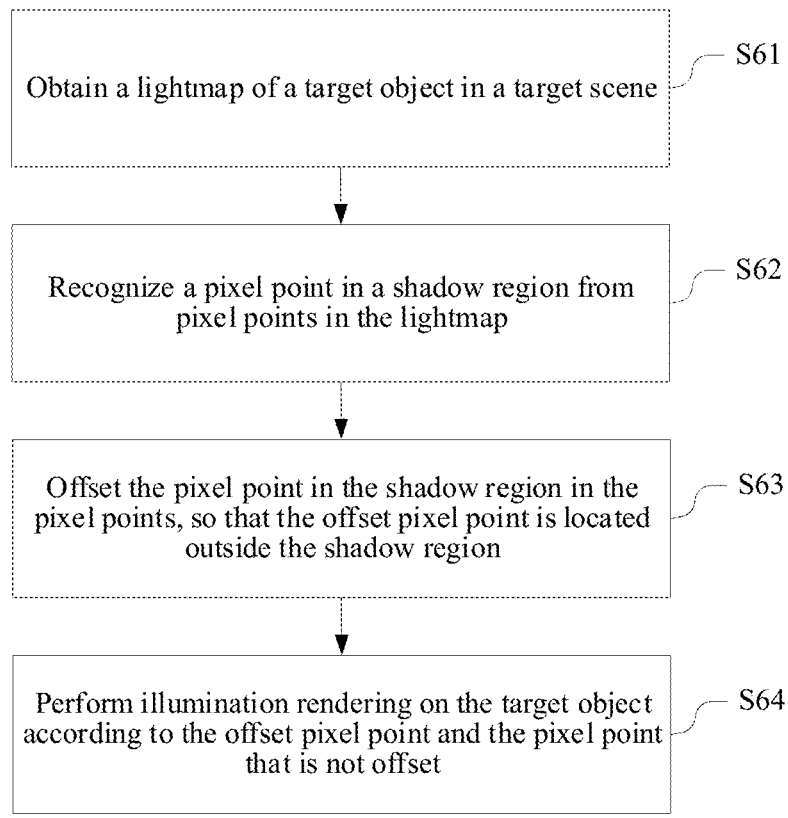
FIG. 6 is a flowchart of an illumination rendering method according to an embodiment of the disclosure.

FIG. 6 is an implementation flowchart of an illumination rendering method according to an embodiment of the disclosure. The method is applied to the terminal device 110 or the server 130 shown in FIG. 1. A specific implementation process of the method includes the following operations:

S61: Obtain a lightmap of a target object in a target scene.

S62: Recognize a pixel point in a shadow region from pixel points in the lightmap.

An example embodiment of recognizing a pixel point in a shadow region from pixel points in the lightmap includes:

determining, for any pixel point in the lightmap, a coverage radius corresponding to the pixel point according to a distance between each adjacent pixel point of the pixel point and the pixel point, the distance between the each adjacent pixel point of the pixel point and the pixel point being determined according to world coordinates of the pixel point and world coordinates of the each adjacent pixel point; and determining, by using the pixel point as a starting point, that when a ray emitted along at least one tangential direction of the pixel point intersects an unlighted surface of an object in the target scene and a length of the ray is the same as the coverage radius, the pixel point is located in the shadow region.

In an example embodiment, the determining, in the lightmap of the target object in which the pixel point is located, a coverage radius corresponding to the pixel point according to a distance between each adjacent pixel point of the pixel point and the pixel point includes:

determining an average distance between the pixel point and the adjacent pixel points, and setting a product of the average distance and a preset ratio as the coverage radius; or determining a maximum distance between the pixel point and the adjacent pixel points, and setting a product of the maximum distance and a preset ratio as the coverage radius.

For any listed specific implementation of the method for recognizing a pixel point in a shadow region, reference may be made to the foregoing embodiment, for example, the method as shown in FIG. 2, and repeated content is not described herein again.

S63: Offset the pixel point in the shadow region in the pixel points, so that the offset pixel point is located outside the shadow region.

In an example embodiment, a specific implementation of offsetting the pixel point in the shadow region in the pixel points includes:

determining an offset corresponding to the pixel point according to an intersection between the ray and the unlighted surface, and offsetting the pixel point according to the offset, so that the offset pixel point is located outside the shadow region.

When the offset corresponding to the pixel point is determined according to the intersection between the ray and the unlighted surface, and the pixel point is offset according to the offset, there are the following two offset manners:

Offset manner I: Set a distance between a starting point of the ray and the intersection between the ray and the unlighted surface as the offset, and move the pixel point along a direction of the ray by the offset.

Offset manner II: The offset includes a first offset and a second offset.

The determining an offset corresponding to the pixel point according to an intersection between the ray and the unlighted surface, and offsetting the pixel point according to the offset includes:

setting a distance between the starting point of the ray and the intersection between the ray and the unlighted surface as the first offset, and setting a preset distance as the second offset;

and moving the pixel point along a direction of the ray by the first offset, and moving, by the second offset, the pixel point along a normal direction of an object intersecting the ray.

In an example embodiment, in a case that at least two rays intersect an unlighted surface of an object in the target scene, the ray is a ray that is of the at least two rays and that is with the shortest distance from a starting point of the ray to an intersection between the ray and the unlighted surface.

For any listed specific implementation of the offset processing method, reference may be made to the foregoing embodiment, for example, as shown in FIG. 5B or FIG. 5C, and repeated content is not described herein again.

S64: Perform illumination rendering on the target object according to the offset pixel point and the pixel point that is not offset.

In this embodiment of the disclosure, when illumination rendering is performed on the target object according to the offset pixel point and the pixel point that is not offset, lighting information corresponding to each pixel point may be calculated by using a path tracing algorithm, so as to perform illumination rendering according to the lighting information.

The lighting information is a color value, which is in a three-primary-color (red, green, and blue, RGB) format. For any pixel point in the lightmap, the calculation of lighting information may mainly include the following steps:

(a) Set the pixel point as a center of a hemisphere, and emit a ray along a direction from the center of the hemisphere to a random point on a hemispherical surface, where the hemispherical surface is a surface corresponding to a positive direction of a normal of the pixel point, and a radius of the hemisphere is a unit 1.

Figure 7:
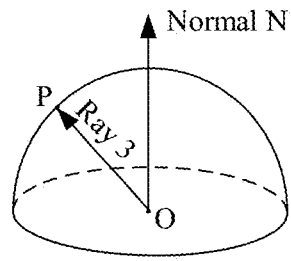
FIG. 7 is a schematic diagram of a hemispherical surface according to an embodiment of the disclosure.

Assuming that the pixel point is O, a normal N is a normal corresponding to the pixel point, a positive direction of the normal is shown in FIG. 7, P is a point on the hemispherical surface, and a ray 3 may be randomly emitted along a direction from O to P.

(b) Calculate a pixel value of the pixel point if the ray intersects an object.

(c) Set an intersection between the ray and the object as the center of the hemisphere, and continue to emit a ray along a direction from the center of the hemisphere to a random point on the hemispherical surface, where the hemispherical surface is still a surface corresponding to the positive direction of the normal of the pixel point, and the radius of the hemisphere is a unit 1.

(d) Continuously perform steps (b) and (c) until a maximum depth of a path is satisfied (assuming that the maximum depth is 5 to 10, and a good reflection effect can be basically achieved).

(e) Continue to emit a ray in a direction of the pixel point after the maximum depth of the path is satisfied, and perform path iteration until the maximum quantity of iterations is reached.

(f) Calculate the lighting information of the pixel point according to results of a plurality of iterations by using the Monte Carlo method, where the calculation method is as follows:

$$F^N = \frac{1}{N}\sum_{i=1}^{N} \frac{f(X_i)}{pdf(X_i)}$$

$F^N$ is final lighting data (which is in an RGB format) of the pixel point, N is a quantity of iterations finally performed, $f(X_i)$ is a pixel value obtained in each path iteration; and $pdf(X_i)$ is a probability distribution function corresponding to each path.

In step (a), if the pixel point is an offset pixel point, and at the pixel point, that is, a new position of the pixel point obtained after being offset, the pixel point A in FIG. 5B is used as an example, a center position is the intersection 1. If the pixel point is a pixel point that is not offset, the pixel point is at an old position, that is, a position obtained through general rasterization.

Path tracing is a method of global illumination. On the basis of direct lighting, light further bounces between objects, which can simulate the characteristics of realistic light, thereby illuminating an entire scene. The manner that is of rendering lighting information of a corresponding pixel point by using a path tracing algorithm and that is listed in this embodiment of the disclosure is merely an example, any manner, such as a ray tracing algorithm, of rendering lighting information of a pixel point based on GBuffer data of the pixel point is applicable to this embodiment of the disclosure.

In the foregoing embodiment, after GBuffer data of the lightmap is generated by through general rasterization, GBuffer data of some of the pixel points is updated through non-uniform rasterization. The pixel point is offset, so that a probability that the pixel point in a light-reachable region is increased, and therefore the problem of shadow leakage can be effectively reduced. In addition, a resolution of the lightmap does not need to be increased in this manner, avoiding increasing a storage space of the lightmap and reducing rendering efficiency.

An example in which illumination rendering is performed on an object in a game scene is used. To bake lightmaps of objects, a specific texture space (that is, a UV space) is allocated to each object according to an area of the object and a baking resolution set by a user. A plurality of sampling points (that is, pixel points) are set on a surface of each object, and lighting information of each sampling point is calculated by using a global illumination algorithm invoked by a baking system. After the calculation is completed, the lighting information is stored into the lightmap, so that when the game is running, the object is rendered by sampling the lightmap.

Figure 8:
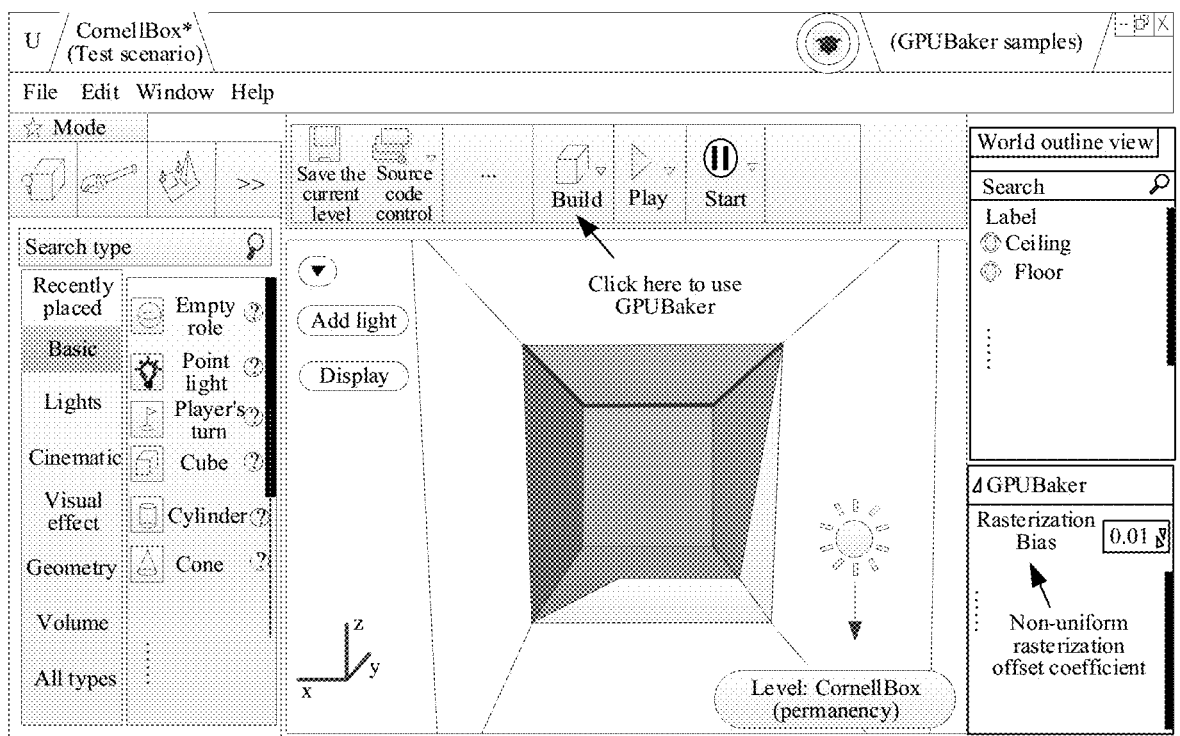
FIG. 8 is a schematic diagram of an operation interface of an illumination rendering tool according to an embodiment of the disclosure.

FIG. 8 is a schematic diagram of an operation interface of software graphics processing unit baker (GPUBaker) for illumination rendering according to an embodiment of the disclosure. GPUBaker is a tool that implements lightmap data baking on a GPU, which mainly provides offline global illumination rendering of game scenes for self-developed game engines and studio groups. In a game, during rendering of lightmaps, a resolution of the lightmap of each object needs to be set, UV information, and normal information and tangent information in a world coordinate system of each vertex of the object in the lightmap are provided, and core content is rendered by using a path tracing algorithm.

CornellBox is the most commonly used scene for testing global illumination. A common Cornell Box is a square box. All walls of the box are diffuse reflection planes. There is a lamp at a center of a top portion of the box. The left and right walls have different colors, and other walls are white. Various objects are placed in the scene.

In the embodiment shown in FIG. 8, illumination rendering is performed by using the CornellBox as an example. The GPUBaker can be used by clicking Build, where Rasterization Bias is a non-uniform rasterization offset coefficient, which is the second offset listed in the above embodiment.

Non-uniform rasterization may be implemented by using the tool shown in FIG. 8. After GBuffer data of a lightmap space is generated through non-uniform rasterization, the lightmap is rendered by performing path tracing, and most of the problems shadow leakage can be resolved.

Figure 9A:
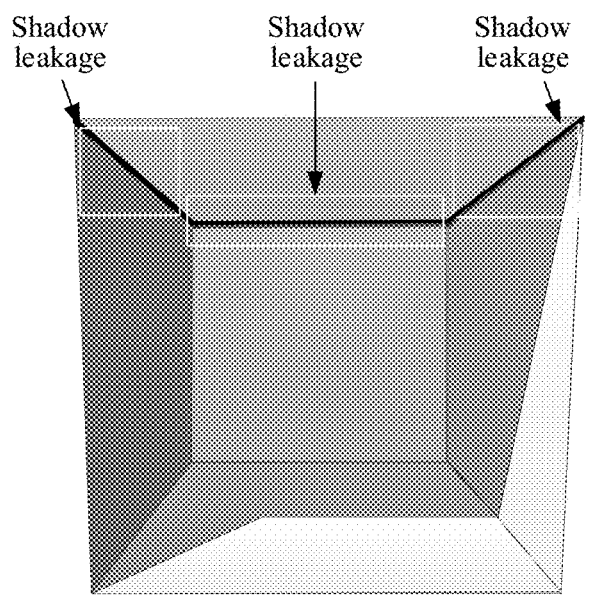
FIG. 9A is an effect diagram of illumination rendering according to an embodiment of the disclosure.
Figure 9B:
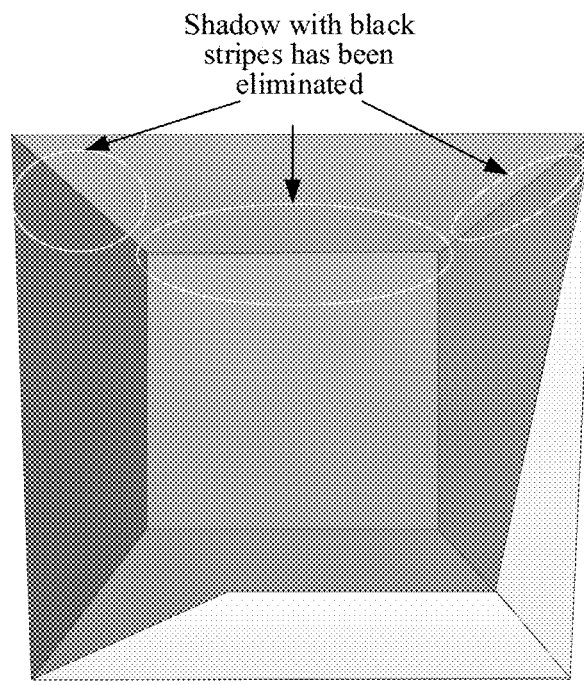
FIG. 9B is an effect diagram of another illumination rendering according to an embodiment of the disclosure.

Two screenshots shown in FIG. 9A and FIG. 9B are effect diagrams of comparison between a screenshot which is obtained through illumination rendering by using normal rasterization and a screenshot which is obtained through illumination rendering by using improved non-uniform rasterization.

Referring to FIG. 9A, pixel points in shadow regions are not offset. After GBuffer data of the pixel point is obtained through general rasterization, an image is directly obtained through illumination rendering by using a path tracing algorithm. It can be seen from the figure that there are three parts of which have shadow leakage. FIG. 9B is an image obtained by using the illumination rendering method according to the embodiments of the disclosure. Compared with FIG. 9A, it can be seen that the shadow leakage of the three parts in the figure has been eliminated.

Figure 10:
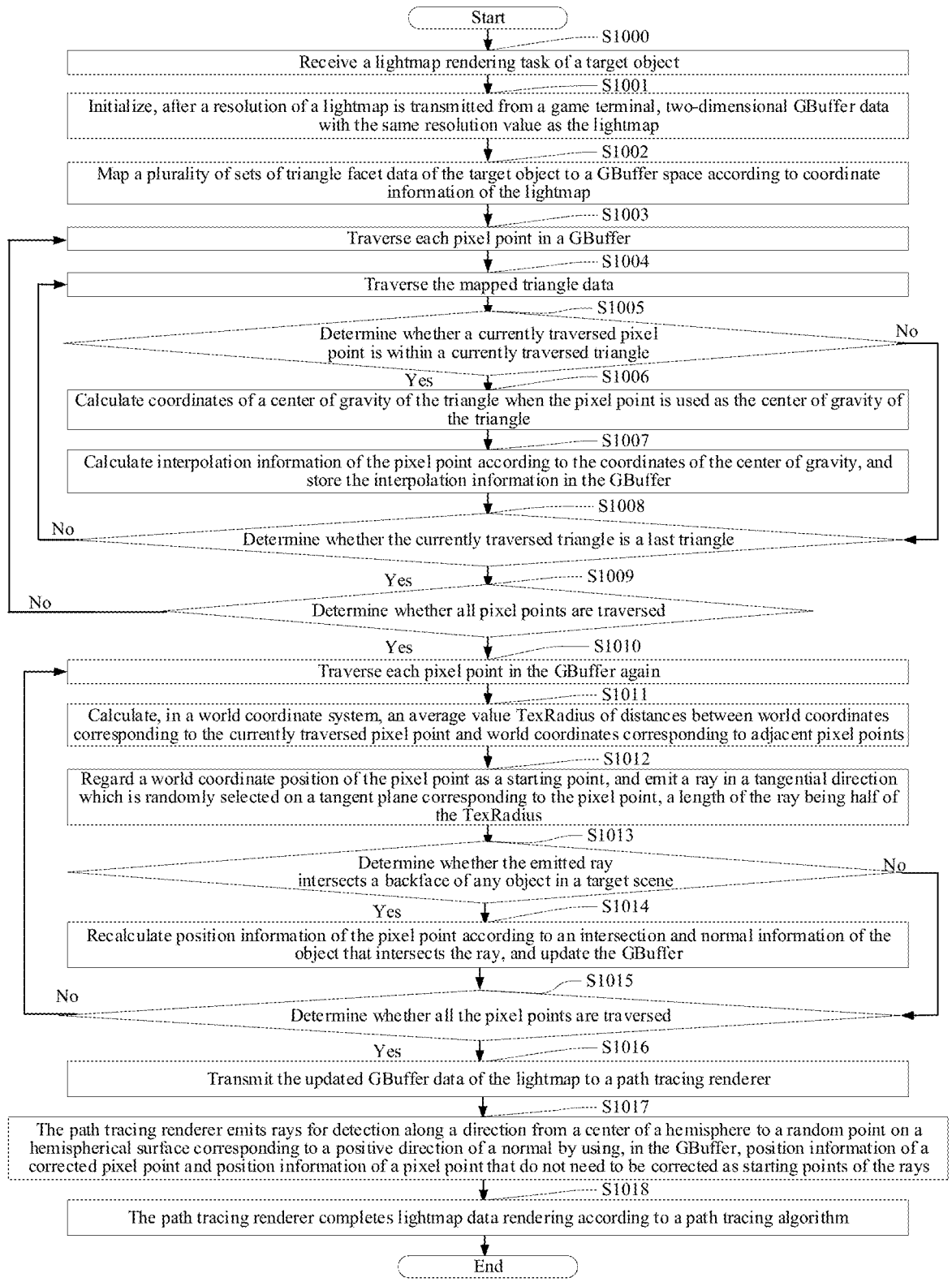
FIG. 10 is a schematic flowchart of an optional timing sequence for implementing illumination rendering according to an embodiment of the disclosure.

FIG. 10 is a complete flowchart of rendering a game scene by using an offline lightmap listed in an embodiment of the disclosure. A specific implementing process of the method is as follows:

Operation 1000: Receive a lightmap rendering task of a target object.

Operation 1001: Initialize, after a resolution of a lightmap is transmitted from a game terminal, two-dimensional GBuffer data with the same resolution value as the lightmap.

Operation 1002: Map a plurality of sets of triangle facet data of the target object to a GBuffer space according to coordinate information of the lightmap.

Operation 1003: Traverse each pixel point in a GBuffer.

Operation 1004: Traverse the mapped triangle data.

Operation 1005: Determine whether a currently traversed pixel point is within a currently traversed triangle, if yes, perform step 1006, and otherwise, perform step 1008.

Operation 1006: Calculate coordinates of a center of gravity of the triangle when the pixel point is used as the center of gravity of the triangle.

Operation 1007: Calculate interpolation information of the pixel point according to the coordinates of the center of gravity, and store the interpolation information in the GBuffer.

Operation 1008: Determine whether the currently traversed triangle is a last triangle, if yes, perform step 1009, and otherwise, return to step 1004.

Operation 1009: Determine whether all pixel points are traversed, if yes, perform step 1010, and otherwise, return to step 1003.

Operation 1010: Traverse each pixel point in the GBuffer again.

Operation 1011: Calculate, in a world coordinate system, an average value TexRadius of distances between world coordinates corresponding to the currently traversed pixel point and world coordinates corresponding to adjacent pixel points.

Operation 1012: Set a world coordinate position of the pixel point as a starting point, and emit a ray in a tangential direction which is randomly selected on a tangent plane corresponding to the pixel point, a length of the ray being half of the TexRadius.

Operation 1013: Determine whether the emitted ray intersects a backface of an object in a target scene, if yes, perform step 1014, and otherwise, perform step 1015.

Operation 1014: Recalculate position information of the pixel point according to an intersection and normal information of the object that intersects the ray, and update the GBuffer.

Operation 1015: Determine whether all the pixel points are traversed, if yes, perform step 1016, and otherwise, return to step 1010.

Operation 1016: Transmit the updated GBuffer data of the lightmap to a path tracing renderer.

Operation 1017: The path tracing renderer emits rays for detection along a direction from a center of a hemisphere to a random point on a hemispherical surface corresponding to a positive direction of a normal by using, in the GBuffer, position information of a corrected pixel point and position information of a pixel point that do not need to be corrected as starting points of the rays.

Operation 1018: The path tracing renderer completes lightmap data rendering according to a path tracing algorithm.

Operation 1001 to operation 1009 are the specific process of obtaining the GBuffer data of each pixel point by using the general rasterization algorithm. Operation 1010 to operation 1016 are a process of recognizing a pixel point in a shadow region, offsetting the pixel point in the shadow region, and updating GBuffer data according to the embodiments of the disclosure.

In operation 1014, when the position information of the pixel point is recalculated according to the intersection and the normal information of the object intersecting the ray, calculation may be performed according to new_pos=old_pos+ray.dir*hit.distance+hit.face_normal*bias, and repeated content is not described herein again.

It is to be understood that, although the steps in the flowcharts of FIG. 2, FIG. 6, and FIG. 10 are sequentially displayed according to indication of arrows, the operations are not necessarily sequentially performed in the sequence indicated by the arrows. Unless clearly specified in this specification, there is no strict sequence limitation on the execution of the operations, and the operations may be performed in another sequence. In addition, at least some operations in FIG. 2, FIG. 6, and FIG. 10 may include a plurality of sub-operations or a plurality of stages. The sub-operations or the stages are not necessarily performed at the same moment, and instead may be performed at different moments. The sub-operations or the stages are not necessarily performed sequentially, and instead may be performed in turn or alternately with another operation or at least some of sub-operations or stages of the another operation.

Figure 11:
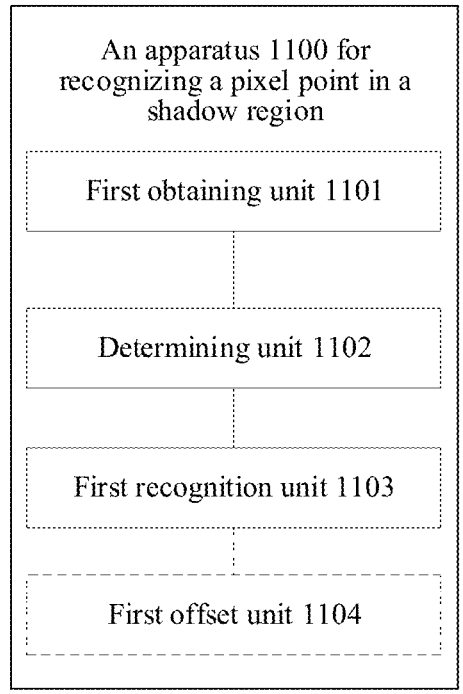
FIG. 11 is a schematic diagram of a composition structure of an apparatus for recognizing a pixel point in a shadow region according to an embodiment of the disclosure.

As shown in FIG. 11, an apparatus 1100 for recognizing a pixel point in a shadow region is provided, including:

a first obtaining code 1101, configured to obtain a lightmap of a target object in a target scene;

a determining code 1102, configured to determine, according to a distance between each adjacent pixel point of a pixel point in the lightmap and the pixel point, a coverage radius corresponding to the pixel point, the distance between the each adjacent pixel point of the pixel point and the pixel point being determined according to world coordinates of the pixel point and world coordinates of the each adjacent pixel point; and a first recognition code 1103, configured to determine, by using the pixel point as a starting point, that when a ray emitted along at least one tangential direction of the pixel point intersects an unlighted surface of an object in the target scene and a length of the ray is the same as the coverage radius, the pixel point is located in the shadow region.

In an example embodiment, the determining code 1102 is further configured to:

determine an average distance between the pixel point and the adjacent pixel points, and set a product of the average distance and a preset ratio as the coverage radius; or determine a maximum distance between the pixel point and the adjacent pixel points, and set a product of the maximum distance and a preset ratio as the coverage radius.

In an example embodiment, the apparatus further includes:

a first offset unit 1104, configured to determine an offset corresponding to the pixel point according to an intersection between the ray and the unlighted surface, and offset the pixel point according to the offset, so that the offset pixel point is located outside the shadow region.

In an example embodiment, the first offset code 1104 is further configured to:

set a distance between the starting point of the ray and the intersection between the ray and the unlighted surface as the offset, and move the pixel point along a direction of the ray by the offset.

In an example embodiment, the offset includes a first offset and a second offset; and the first offset code 1104 is further configured to:

set a distance between the starting point of the ray and the intersection between the ray and the unlighted surface as the first offset, and set a preset distance as the second offset; and move the pixel point along a direction of the ray by the first offset, and move, by the second offset, the pixel point along a normal direction of an object intersecting the ray.

In an example embodiment, in a case that at least two rays intersect an unlighted surface of an object in the target scene, the ray is a ray that is of the at least two rays and that is with the shortest distance from a starting point of the ray to an intersection between the ray and the unlighted surface.

Figure 12:
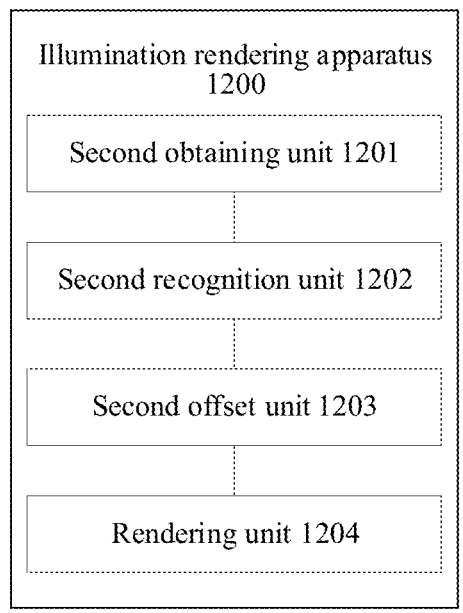
FIG. 12 is a schematic diagram of a composition structure of an illumination rendering apparatus according to an embodiment of the disclosure.
Figure 13:
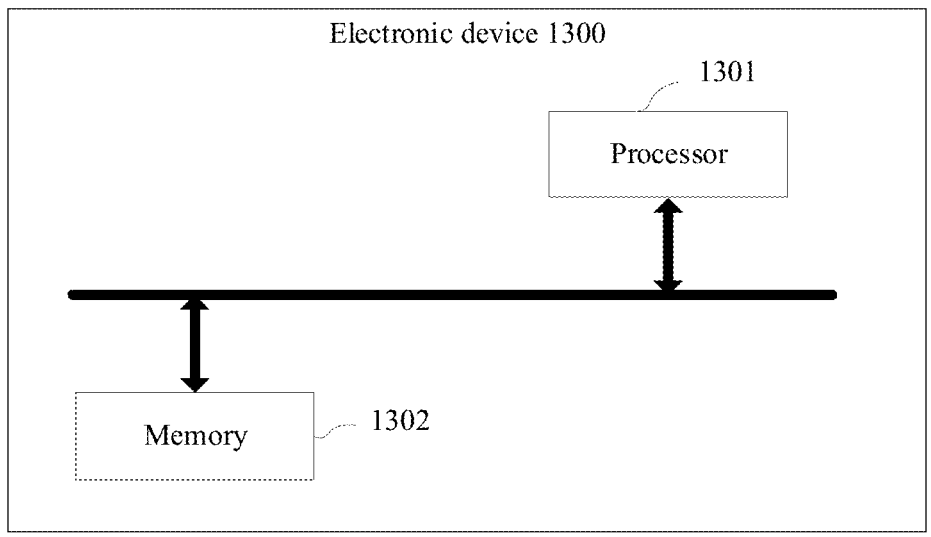
FIG. 13 is a schematic diagram of a composition structure of an electronic device according to an embodiment of the disclosure.

FIG. 12 is a schematic structural diagram of an illumination rendering apparatus 1200, including:

a second obtaining code 1201, configured to obtain a lightmap of a target object in a target scene;

a second recognition code 1202, configured to recognize a pixel point in a shadow region from pixel points in the lightmap;

a second offset code 1203, configured to offset the pixel point in the shadow region in the pixel points, so that the offset pixel point is located outside the shadow region; and a rendering code 1204, configured to perform illumination rendering on the target object according to the offset pixel point and the pixel point that is not offset.

In an example embodiment, the second recognition code 1202 is further configured to:

determine, for any pixel point in the lightmap, a coverage radius corresponding to the pixel point according to a distance between each adjacent pixel point of the pixel point and the pixel point, the distance between the each adjacent pixel point of the pixel point and the pixel point being determined according to world coordinates of the pixel point and world coordinates of the each adjacent pixel point; and determine, by using the pixel point as a starting point, that when a ray emitted along at least one tangential direction of the pixel point intersects an unlighted surface of an object in the target scene and a length of the ray is the same as the coverage radius, the pixel point is located in the shadow region.

In an example embodiment, the second recognition code 1202 is further configured to:

determine an average distance between the pixel point and the adjacent pixel points, and set a product of the average distance and a preset ratio as the coverage radius; or determine a maximum distance between the pixel point and the adjacent pixel points, and set a product of the maximum distance and a preset ratio as the coverage radius.

In an example embodiment, the second offset code 1203 is further configured to:

determine, for any pixel point in the lightmap, an offset corresponding to the pixel point according to an intersection between the ray and the unlighted surface, and offset the pixel point according to the offset.

In an example embodiment, the second offset code 1203 is further configured to:

set a distance between the starting point of the ray and the intersection between the ray and the unlighted surface as the offset, and move the pixel point along a direction of the ray by the offset.

In an example embodiment, the offset includes a first offset and a second offset; and the second offset code 1203 is further configured to:

set a distance between the starting point of the ray and the intersection between the ray and the unlighted surface as the first offset, and set a preset distance as the second offset; and move the pixel point along a direction of the ray by the first offset, and move, by the second offset, the pixel point along a normal direction of an object intersecting the ray.

In an example embodiment, in a case that at least two rays intersect an unlighted surface of an object in the target scene, the ray is a ray that is of the at least two rays and that is with the shortest distance from a starting point of the ray to an intersection between the ray and the unlighted surface.

For ease of description, the foregoing components are respectively described as various code (or modules/units) divided according to functions. During the implementation of the disclosure, the function of the various code (or modules/units) may be implemented in a same piece of or multiple pieces of software or hardware.

A person skilled in the art can understand that various aspects of the disclosure may be implemented as systems, methods, or computer program products. Therefore, each aspect of the disclosure may be specifically implemented in the following forms, that is, the implementation form of complete hardware, complete software (including firmware and micro code), or a combination of hardware and software, which may be uniformly referred to as "circuit", "module", or "system" herein.

In some example embodiments, an electronic device 1300 of the disclosure may be the terminal device 110 or the server 130 in FIG. 1. The electronic device 1300 may include at least one processor 1301 and at least one memory 1302. The memory 1302 stores program code, the program code, when executed by the processor 1301, causing the processor 1301 to perform the steps in the method for recognizing a pixel point in a shadow region and the illumination rendering method described above in the specification according to various exemplary embodiments of the disclosure. For example, the processing 1301 may perform the steps shown in FIG. 2 or FIG. 6.

In some example embodiments, the computing apparatus according to the disclosure may at least include at least one processing unit and at least one storage unit. The storage unit stores program code, the program code, when executed by the processing unit, causing the processing unit to perform the steps in the method for recognizing a pixel point in a shadow region and the illumination rendering method described above in the specification according to various exemplary embodiments of the disclosure. For example, the processing unit may perform the steps shown in FIG. 2 or FIG. 6.

A computing apparatus 140 according to this embodiment of the disclosure is described below with reference to FIG. 14. The computing apparatus 140 shown in FIG. 14 is only an example, and does not impose any restriction on functions and scopes of use of the embodiments of the disclosure.

Figure 14:
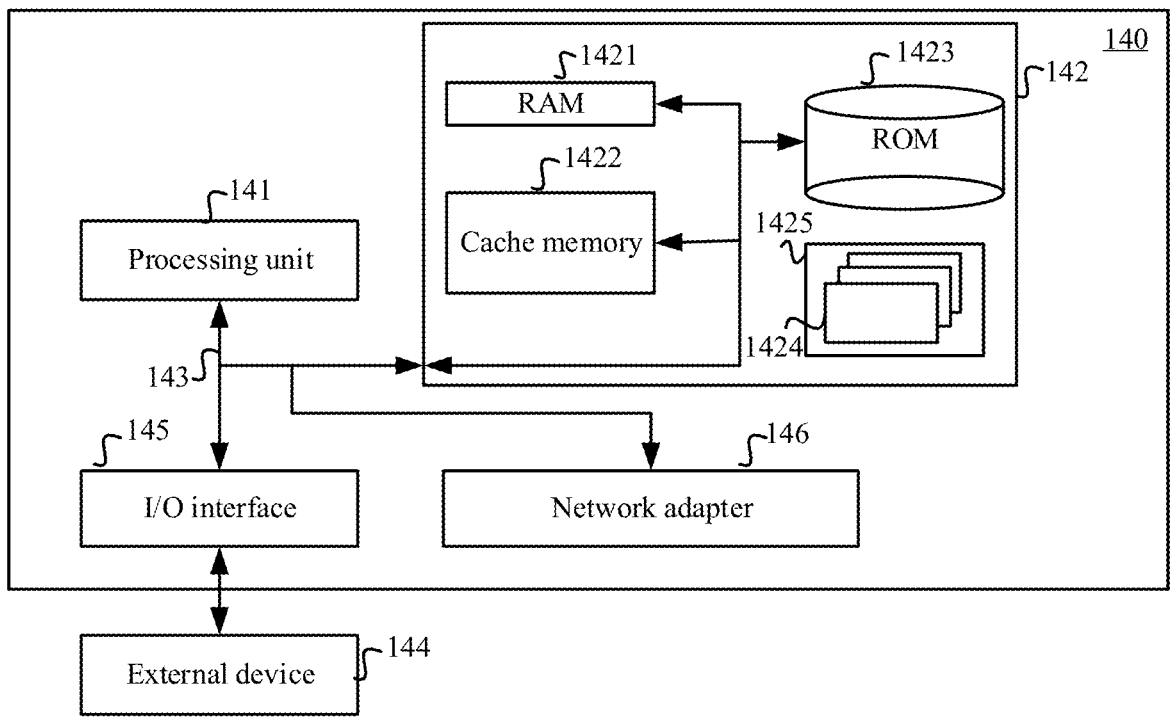
FIG. 14 is a schematic diagram of a composition structure of hardware of a computing apparatus to which an embodiment of the disclosure is applied.

As shown in FIG. 14, the computing apparatus 140 is shown in the form of a general computing apparatus. Components of the computing apparatus 140 may include, but are not limited to, at least one processing unit 141, at least one storage unit 142, and a bus 143 connected to different system components (including the storage unit 142 and the processing unit 141).

The bus 143 represents one or more of several types of bus structures, including a memory bus or a memory controller, a peripheral bus, a processor, or a local bus using any bus structure among various bus structures.

The storage unit 142 may include a readable medium in a form a volatile memory, such as a random access memory (RAM) 1421 and/or a cache storage unit 1422, and may further include a read-only memory (ROM) 1423.

The storage unit 142 may further include a program/utility 1425 having a set of (at least one) program modules 1424. Such a program module 1424 includes, but is not limited to, an operating system, one or more application programs, other program modules, and program data. Each or a combination of these examples may include implementation of a network environment.

The computing apparatus 140 may further communicate with one or more external devices 144 (such as a keyboard and a pointing device), and may further communicate with one or more devices that enable a user to interact with the computing apparatus 140, and/or any device (such as a router or a modem) that enables the computing apparatus 140 to communicate with one or more other computing apparatuses. This communication may be performed through an input/output (I/O) interface 145. In addition, the computing apparatus 140 may further communicate with one or more networks, such as a local area network (LAN), a wide area network (WAN), and/or a public network, (such as the Internet) by using a network adapter 146. As shown in the figure, the network adapter 146 communicates with other modules configured to the computing apparatus 140 by using the bus 143. It is to be understood that, although not shown in the figure, other hardware and/or software modules may be used in combination with the computing apparatus 140, including, but not limited to: micro code, a device driver, a redundancy processor, an external disk drive array, a RAID system, a tape drive, a data backup storage system, and the like.

In some possible implementations, each aspect of the method for recognizing a pixel point in a shadow region or the illumination rendering method provided in the disclosure may be further implemented in a form of a program product including program code. When the program product is run on a computer device, the program code is used for enabling the computer device to perform steps of the method for recognizing a pixel point in a shadow region or the illumination rendering method according to the various exemplary implementations of the disclosure described above in the specification. For example, the computer device can perform the steps shown in FIG. 2 or FIG. 6.

The program product may use any combination of one or more readable media. The readable medium may be a readable signal medium or a readable storage medium. The readable storage medium may be, for example, but is not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The program product used for the method for recognizing a pixel point in a shadow region or the illumination rendering method according to an implementation of the disclosure may use a CD-ROM, include program code, and may be run on the computing apparatus. However, the program product of the disclosure is not limited to this. In this specification, the readable storage medium may be any tangible medium including or storing a program, and the program may be used by or in combination with an instruction execution system, apparatus, or device.

The readable signal medium may include a data signal propagated in a baseband or as part of a carrier, and stores readable program code. The data signal propagated in such a way may assume a plurality of forms, including, but not limited to, an electromagnetic signal, an optical signal, or any appropriate combination thereof. The readable signal medium may alternatively be any readable medium other than the readable storage medium. The readable medium may be configured to transmit, propagate, or transmit a program used by or used in combination with an instruction execution system, an apparatus, or a device.

The program code included in the readable medium may be transmitted by using any appropriate medium, including but not limited to, a wireless medium, a wired medium, an optical cable, radio frequency (RF) or the like, or any appropriate combination thereof.

The program code for executing the operations of the disclosure may be written by using any combination of one or more programming languages. The programming languages include an object-oriented programming language such as Java and C++, and also include a conventional procedural programming language such as "C" or similar programming languages. The program code may be completely executed on a computing apparatus of a user, partially executed on a user equipment, executed as an independent software package, partially executed on a computing apparatus of a user and partially executed on a remote computing apparatus, or completely executed on a remote computing apparatus or server. For the case involving a remote computing apparatus, the remote computing apparatus may be connected to a computing apparatus of a user through any type of network including a LAN or a WAN, or may be connected to an external computing apparatus (for example, through the Internet by using an Internet service provider).

Although several units or subunits of the apparatus are mentioned in detailed description above, such division is merely an example but not mandatory. In fact, according to the implementations of the disclosure, features and functions of two or more units described above may be specified in one unit. On the contrary, the features or functions of one unit described above may further be divided and specified by a plurality of units.

In addition, although the operations of the method in the disclosure are described in a specific order in the accompanying drawings. This does not require or imply that the operations have to be performed in the specific order, or all the operations shown have to be performed to achieve an expected result. Additionally or alternatively, some steps may be omitted, and a plurality of steps are combined into one step to be performed, and/or one step is divided into a plurality of steps to be performed.

A person skilled in the art is to understand that the embodiments of the disclosure may be provided as a method, a system, or a computer program product. Therefore, the disclosure may take the form of total hardware embodiments, total software embodiments, or embodiments combining software and hardware. Moreover, the disclosure may use a form of a computer program product that is implemented on one or more computer-usable storage media (including but not limited to a magnetic disk memory, a CD-ROM, an optical memory, and the like) that include computer-usable program code.

The computer program product includes program code, the program code is stored in a computer-readable storage medium. When a processor of an electronic device reads and executes the program code from the computer-readable storage medium, the electronic device is caused to perform the steps of any one of the method for recognizing a pixel point in a shadow region or the illumination rendering method.

This application is described with reference to flowcharts and/or block diagrams of the method, the device (system), and the computer program product according to the embodiments of the disclosure. It is to be understood that computer program instructions can implement each process and/or block in the flowcharts and/or block diagrams and a combination of processes and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more processes in the flowcharts and/or one or more blocks in the block diagrams is generated by using instructions executed by the computer or the processor of the another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing functions specified in one or more processes in the flowcharts and/or one or more blocks in the block diagrams.

Although preferable embodiments of the disclosure have been described, once persons skilled in the technology know a basic creative concept, they can make other changes and modifications to these embodiments. Therefore, the following claims are intended to be construed as to cover the exemplary embodiments and all changes and modifications falling within the scope of the disclosure.

Obviously, a person skilled in the art can make various modifications and variations to the disclosure without departing from the spirit and scope of the disclosure. In this case, if the modifications and variations made to the disclosure fall within the scope of the claims of the disclosure and their equivalent technologies, the disclosure is intended to include these modifications and variations.

What is claimed is:

1. A method for recognizing a pixel point in a shadow region, performed by an electronic device, the method comprising:
    obtaining a lightmap of a target object in a target scene;
    determining, according to a distance between each adjacent pixel point of the pixel point in the lightmap and the pixel point, a coverage radius corresponding to the pixel point, the determining the coverage radius comprising:
    determining an average three-dimensional distance between world coordinates of the pixel point and world coordinates of the adjacent pixel points, and setting a product of the average three-dimensional distance and a preset ratio as the coverage radius; and
    determining, by using the pixel point as a starting point, that when a ray emitted along at least one tangential direction of the pixel point intersects an unlighted surface of an object in the target scene and a length of the ray is the same as the coverage radius, the pixel point is located in a shadow region.

2. The method according to claim 1, further comprising:
    determining an offset corresponding to the pixel point according to an intersection between the ray and the unlighted surface, and offsetting the pixel point according to the offset, so that the offset pixel point is located outside the shadow region.

3. The method according to claim 2, further comprising:
    setting a distance between the starting point of the ray and the intersection between the ray and the unlighted surface as the offset, and moving the pixel point along a direction of the ray by the offset.

4. The method according to claim 3, wherein in a case that at least two rays intersect an unlighted surface of an object in the target scene, the ray is a ray that is of the at least two rays and that is with the shortest distance from a starting point of the ray to an intersection between the ray and the unlighted surface.

5. The method according to claim 2, wherein the offset comprises a first offset and a second offset; and
    the determining an offset corresponding to the pixel point according to an intersection between the ray and the unlighted surface, and offsetting the pixel point according to the offset comprises:
    setting a distance between the starting point of the ray and the intersection between the ray and the unlighted surface as the first offset, and setting a preset distance as the second offset; and
    moving the pixel point along a direction of the ray by the first offset, and moving, by the second offset, the pixel point along a normal direction of an object intersecting the ray.

6. The method according to claim 2, wherein in a case that at least two rays intersect an unlighted surface of an object in the target scene, the ray is a ray that is of the at least two rays and that is with the shortest distance from a starting point of the ray to an intersection between the ray and the unlighted surface.

7. An apparatus for recognizing a pixel point in a shadow region, comprising:
at least one memory configured to store program code; and
at least one processor configured to read the program code and operate as instructed by the program code, the program code comprising:
first obtaining code configured to cause the at least one processor to obtain a lightmap of a target object in a target scene;
determining code configured to cause the at least one processor to determine, according to a distance between each adjacent pixel point of the pixel point in the lightmap and the pixel point, a coverage radius corresponding to the pixel point, the determining the coverage radius comprising:
determining an average three-dimensional distance between world coordinates of the pixel point and world coordinates of the adjacent pixel points, and setting a product of the average three-dimensional distance and a preset ratio as the coverage radius; and
first recognition code configured to cause the at least one processor to determine, by using the pixel point as a starting point, that when a ray emitted along at least one tangential direction of the pixel point intersects an unlighted surface of an object in the target scene and a length of the ray is the same as the coverage radius, the pixel point is located in the shadow region.

8. The apparatus according to claim 7, further comprising:
first offset code, configured to cause the at least one processor to determine an offset corresponding to the pixel point according to an intersection between the ray and the unlighted surface, and offset the pixel point according to the offset, so that the offset pixel point is located outside the shadow region.

9. The apparatus according to claim 8, wherein the first offset code is further configured to cause the at least one processor to:
set a distance between the starting point of the ray and the intersection between the ray and the unlighted surface as the offset, and move the pixel point along a direction of the ray by the offset.

10. The apparatus according to claim 9, wherein in a case that at least two rays intersect an unlighted surface of an object in the target scene, the ray is a ray that is of the at least two rays and that is with the shortest distance from a starting point of the ray to an intersection between the ray and the unlighted surface.

11. The apparatus according to claim 8, wherein the first offset code comprises a first offset and a second offset; and
the first offset code is further configured to cause the at least one processor to
set a distance between the starting point of the ray and the intersection between the ray and the unlighted surface as the first offset, and set a preset distance as the second offset; and
move the pixel point along a direction of the ray by the first offset, and move, by the second offset, the pixel point along a normal direction of an object intersecting the ray.

12. The apparatus according to claim 8, wherein in a case that at least two rays intersect an unlighted surface of an object in the target scene, the ray is a ray that is of the at least two rays and that is with the shortest distance from a starting point of the ray to an intersection between the ray and the unlighted surface.

13. A non-transitory computer-readable storage medium, storing a computer program that when executed by at least one processor causes the at least one processor to:
obtain a lightmap of a target object in a target scene;
determine, according to a distance between each adjacent pixel point of the pixel point in the lightmap and the pixel point, a coverage radius corresponding to the pixel point, the determining the coverage radius comprising:
determining an average three-dimensional distance between world coordinates of the pixel point and world coordinates of the adjacent pixel points, and setting a product of the average three-dimensional distance and a preset ratio as the coverage radius; and
determine, by using the pixel point as a starting point, that when a ray emitted along at least one tangential direction of the pixel point intersects an unlighted surface of an object in the target scene and a length of the ray is the same as the coverage radius, the pixel point is located in a shadow region.

14. The memory storage medium according to claim 13, further configured to cause the at least one processor to
determine an offset corresponding to the pixel point according to an intersection between the ray and the unlighted surface, and offset the pixel point according to the offset, so that the offset pixel point is located outside the shadow region.

15. The memory storage medium according to claim 14, further configured to cause the at least one processor to:
set a distance between the starting point of the ray and the intersection between the ray and the unlighted surface as the offset, and move the pixel point along a direction of the ray by the offset.

16. The memory storage medium according to claim 14, wherein the offset comprises a first offset and a second offset, and
the determining an offset corresponding to the pixel point according to an intersection between the ray and the unlighted surface, and offsetting the pixel point according to the offset comprises:
setting a distance between the starting point of the ray and the intersection between the ray and the unlighted surface as the first offset, and setting a preset distance as the second offset; and
moving the pixel point along a direction of the ray by the first offset, and moving, by the second offset, the pixel point along a normal direction of an object intersecting the ray.

17. The memory storage medium according to claim 14, wherein in a case that at least two rays intersect an unlighted surface of an object in the target scene, the ray is a ray that is of the at least two rays and that is with the shortest distance from a starting point of the ray to an intersection between the ray and the unlighted surface.

* * * * *